United States Patent [19]

Höhn et al.

[11] 4,358,779

[45] Nov. 9, 1982

[54] METALIZED RECORDING MEDIUM

[75] Inventors: Richard Höhn, Stuttgart; Werner Jung, Waiblingen; Gerhard Winter, Remshalden, all of Fed. Rep. of Germany

[73] Assignee: Robert Bosch GmbH, Stuttgart, Fed. Rep. of Germany

[21] Appl. No.: 250,012

[22] Filed: Apr. 1, 1981

[30] Foreign Application Priority Data

May 7, 1980 [DE] Fed. Rep. of Germany ....... 3017449

[51] Int. Cl.³ .................... G01D 15/34

[52] U.S. Cl. .................... 346/135.1

[58] Field of Search .................... 346/135.1, 76

[56] References Cited

U.S. PATENT DOCUMENTS

| | | | |
|---|---|---|---|
| 2,662,828 | 12/1953 | Dubusc | 346/135.1 X |
| 2,941,901 | 6/1960 | Prill et al. | 346/135.1 X |
| 3,503,855 | 3/1970 | Shor et al. | 346/135.1 X |
| 3,516,911 | 6/1970 | Hopps | 346/135.1 X |
| 3,657,721 | 4/1972 | Traub et al. | 346/135.1 |
| 3,786,518 | 1/1974 | Atherton | 346/135.1 |

*Primary Examiner*—Donald Griffin
*Attorney, Agent, or Firm*—Frishauf, Holtz, Goodman & Woodward

[57] ABSTRACT

To reduce adherence of particles to electrodes and improve the contrast of recording paper, particles of oversized pigments are including in a contrast lacquer or ink layer which have a diameter such that the oversized particles or grains extend out from the lacquer or contrast layer, that is, have a diameter which is greater than the thickness of the ink layer. Suitable particles are carbon black, and calcium carbonate, particularly if darkly colored, present in about 3%-by weight-of the wet content of the lacquer layer which, for example, is a layer of nitrocellulose with finely grained carbon black pigment therein, of a thickness in the order of 1 to 10 μm; the additional oversized pigment granules will have a thickness in the order of about 2 to 20 μm, preferably, on the average, about 5 μm and embedded in lacquer layer of about 2 μm thickness, over which a vapor deposited layer of aluminum of between 0.01 and 0.1 μm is applied. A typical substrate is paper.

16 Claims, 1 Drawing Figure

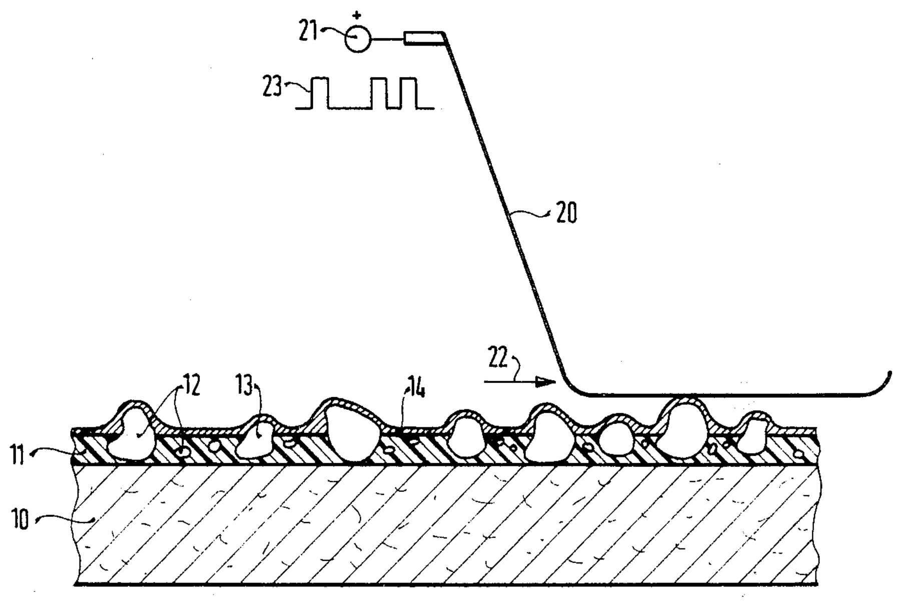
21
+
23
20
22
12
13
14
11
10

METALIZED RECORDING MEDIUM

The present invention relates to a metalized recording medium and more particularly to a recording medium which, typically uses paper as a substrate on which a metalized coating is applied capable of being burned off when subjected to an electrical discharge from an electrode writing on the paper.

BACKGROUND

Various types of recording media are known, see, for example, German Published Patent Application DE-AS No. 27 48 161, which describes a recording medium in form of a strip or tape like carrier made of paper or plastic on which, first, a contrast layer of lacquer or print ink is applied over which an aluminum layer is vapor deposited. To improve legibility of the paper, and particularly to decrease the reflection of light from the metallic surface, it has been proposed to introduce additives into the lacquer or ink contrast layer which provides a mat, or satin surface characteristic. Additives which have been proposed are granulates made of polystyrene or polyethylene in the form of small balls or particles having a grain size between about 0.1 μm and 10 μm. These organic additives to render the surface less shiny and glossy are present in the lacquer coating in addition to pigmentation which usually is carbon black.

THE INVENTION

It is an object to improve the surface characteristics of a metalized recording medium which does not require further additives and which has better temperature characteristics than prior art medium.

Briefly, the pigment particles themselves added to the ink or lacquer coating are used to render the surface less reflective by including in the contrast layer pigment particles of a size which is substantially larger than those used for pigmentation of the lacquer and ink, respectively, and of such size that their average diameter is greater than the thickness of the entire contrast layer, absent said oversized pigment particles.

In a preferred form, soot or carbon black agglomerates forming a primary additive are added to the pigmentation for the contrast layer. The average particle size of soot or carbon black pigments of the primary additive is in the order of 0.1 μm. In accordance with a feature of the invention, secondary carbon additives which have a particle diameter of between 2 to 20 μm, preferably in the range of about 5 to 15 μm are also used. With respect to the wet content of the lacquer or printing ink, that is, when they are freshly applied, the proportion of additives of the oversized, or secondary particles is in the order of about 3% (by weight).

Additional pigmentation may be added to the lacquer or printing ink, that is, pigments other than carbon black; special effects may be obtained thereby.

The recording paper obtained by practising the invention has the advantage that the required satin surface characteristics of the metalized paper can be obtained without the use of additives different from and additional to the pigment used for the lacquer or ink in the contrast layer itself. Further, and importantly, a much higher stability in respect to temperature changes or high temperature of the lacquer or ink contrast layer is obtained, when compared with prior art contrast layers in which organically combustible plastic granules were used. The coarse graininess of the pigmentation additionally has the effect to hold the hot recording electrode off and away from the lacquer or pigment layer, since the electrode upon recording does not slide on the lacquer or pigment surface itself, but, rather, on the oversized pigment granules projecting therefrom.

As used herein, the expression "diameter" of the granules is a general term applied to an average dimension of the pigments since the pigment particles are not usually balls in a mathematical sense. The term "diameter" thus additionally is intended to mean the major dimension of projection of the specific grain or pigment when placed on a substrate.

DRAWING

The single FIGURE is a highly schematic and enlarged cross-sectional view through a recording medium, in which the actual relationship of size has been distorted for ease of illustration.

A paper web, tape or strip, or sheet 10 has a lacquer or printing ink layer 11 applied thereon to form a contrast layer. In accordance with the invention, pigment granules or particles 12, 13 are embedded in the layer 11. The pigment particles 12 are soot or carbon black particles of different diameters. A further pigment particle 13 is shown. The pigment particles are embedded in the layer 11. A metal coating 14, preferably an aluminum layer and applied by vacuum vapor deposition is formed over the layer 11 and the pigment particles 12, 13. Other metal layers can be used, for example, zinc and/or cadmium.

In accordance with a feature of the invention, the diameter of at least a portion of the pigment, as shown in the FIGURE, the soot or carbon black particles 12 and the further particles 13 is larger than the thickness of the lacquer or ink layer 11. In actual practice, a paper carrier having a thickness of between 0.05 to 0.1 mm is suitable; the thickness of the lacquer and ink layer then is in the range of between 1 μm to 10 μm, preferably in the order of about 2 μm. The pigments embedded therein are tiny carbon black agglomerates having a diameter of up to 1.0 μm, and entirely embedded within the lacquer or ink layer. In accordance with the invention, carbon black or soot agglomerates as secondary grains or granules are further introduced. These secondary grains or granules are composed of aggregates of compressed primary pigment particles which in a comminuting process are comminuted to the desired grain size.

The diameter of the carbon black agglomerates is in the range of between about 2 and 20 μm, preferably in the range of between 5 and 15 μm, and, primarily, having a diameter in the order of about 5 μm. The proportion of carbon black pigment is about 3% - by weight - of the wet content of the lacquer or ink. This proportion is not critical and may vary in the range of between 0.5% to 5% by weight. The thickness of the metal layer 14 is between about 0.01 μm and 0.1 μm, preferably between about 0.05 μm and 0.1 μm.

A further pigment 13 can be added besides the carbon black pigment 12 to the ink or lacquer layer. This further pigment 13, for example, may be any one or more of the materials: iron oxide, barium sulphate, silicates, nickel titanate, and particularly copper phthalocyanine, also known as "Heliogenblau"; the additional pigments preferably have a grain size between about 2 μm to 20 μm. Adding uncolored calcium carbonate causes a cartain gray coloration of the contrast layer which is rendered black by the carbon black pigments. This gray coloration is prevented by suitable coloring of the calcium carbonate pigment. The calcium carbonate pigment can be colored by coloring materials dissolved in suitable solvent, if the pigment to be colored has a porous structure. Calcium carbonate can be obtained in porous form by precipitation from a solution; this full porous structure, so obtained is particularly suitable for coloring thereof. Calcium carbonate can also be precipitated in the presence of salts which provide dark colored compounds, for example manganese salts.

The substrate may be paper, which is an inexpensive and suitable material. For particular applications, it may be desirable to utilize other substrates, for example a stabilized plastic film. The present invention is equally applicable to a recording media utilizing a more stable plastic film carrier as the basis for the substrate. The coarsely grained pigments then also cause a satin-surface characteristics, or mat surface aspect of the recording medium, which is obtained to some extent when using paper as a substrate since paper already has a rougher surface, particularly when paper is used which is hardly calendered, or has a generally rough surface characteristic.

Metal recording paper, as currently customarily understood, uses a paper strip, web or tape as carrier material. Before having the metal layer vapor deposited thereon, a layer of nitrocellulose lacquer is applied thereto as a contrast layer. This lacquer layer has finely grained carbon black added as a pigment in order to obtain the necessary black-content required for contrast, and to improve the legibility of the recorded indicia. Additionally, it provides the necessary roughness to insure self-cleaning of the electrodes. Recording electrodes will heat substantially if the carrier is to be recorded over a substantial surface portion thereof, or the entire surface to have an entirely black appearance. Due to the thermal decomposition of the lacquer, residues will remain on the recording electrodes which adhere thereto and which may lead to a securely attached electrically insulating layer on the electrodes. This insulating layer, of course, will interfere with the recording process, and in a limiting case may entirely interrupt recording. In accordance with the feature of the present invention, suitable pigmentation of the pigment layer by oversized granules prevents contact of the hot electrode with the lacquer layer; in other words, the hot electrode is maintained spaced from the lacquer layer itself. By suitable selection of the size and number of the pigments, the writing electrode is carried over the surface of the metal recording paper by sliding essentially over the pigments and thus completely or at least partially carrying the electrode spaced from the remainder of the lacquer layer. The hardness of the pigment particles is so selected that, on the one hand, the electrode is not essentially affected thereby, by frictional engagement, that is, little wear on the electrode; and on the other, that the particles themselves are not substantially reduced by contact with the electrode. Particularly good results are obtained when various pigments are mixed, particularly a mixture of carbon black or soot pigments. It has been found that practically no deposits will form on the electrodes.

Usually, the recording paper is provided in rolls; for special applications, stacked single sheets, or accordion pleat fold paper supply can be used; in manufacture, the material is preferably made as a continuous strip, tape or web and thereafter cut but folded to the desired format.

Sliding of the electrode over the recording paper is schematically illustrated by an electrode 20, upon movement of the recording paper in the direction of the arrow 22. The electrode 20, in form of a thin springy metal strip is suitably energized from a voltage source 21, for example in the order of between 5 to 24 V, in pulse form, as illustrated by the pulse signal 23. Upon occurrence of a pulse, an electrical discharge between the electrode 20 and the metal layer 14 of the recording paper, which is connected to a reference, ground or frame terminal (not shown) will occur, causing burn-off of the metal in the region beneath the electrode, thus leaving exposed the underlying contrast layer and paper and hence an area of visually different appearance from the remainder of the recording paper.

Various changes and modifications may be made within the scope of the inventive concept.

We claim:

1. Metalized recording medium having a substrate carrier (10);

a contrast coating layer (11) applied over the substrate carrier;

a metal layer (14) deposited over the contrast coating layer, said metal layer having a thickness such that it can be burned off by an energized electrode (20), and surface roughening pigment particles (12, 13) included in the contrast layer (11), wherein some of the pigment particles (12, 13) have a diameter which is greater than the thickness of the contrast layer (11) absent said surface roughening pigment particles (12, 13).

2. Recording medium according to claim 1, wherein the surface roughening pigment particles (12) are agglomerates of carbon black having a grain diameter of between about 2 to 20 $\mu$m.

3. Recording medium according to claim 2, wherein the carbon black agglomerate particles (12) have a grain diameter of about between 5 to 15 $\mu$m.

4. Recording medium according to claim 3, wherein the majority of the carbon black agglomerates (12) have a grain diameter in the lower diameter region of said range and at about 5 $\mu$m.

5. Recording medium according to claim 1, wherein said surface roughening pigment particles (12) comprises carbon black agglomerates (12).

6. Recording medium according to claims 2 or 5, wherein the carbon black agglomerate pigment particles (12) are present at between about 0.5 to 5%, by weight, of the wet-content of the contrast coating (11).

7. Recording medium according to claim 6, wherein the surface roughening pigment carbon black agglomerate particles (12) are present in about 3% by weight, and the contrast coating (11) comprises an ink or lacquer, the weight relationship being related to the wet-weight of the ink or lacquer.

8. Recording medium according to claim 1, wherein the surface roughening pigment particles (12, 13) comprise particles of carbon black or soot (12) and further pigment particles (13).

9. Recording medium according to claim 8, wherein the further pigment particles comprise calcium carbonate pigment particles (13) having a porous structure, and colored with a coloring medium penetrated in the porous structure thereof.

10. Recording medium according to claim 8, wherein the further pigment particles comprise at least one of the materials of the group consisting of: iron oxide;

barium sulfate; a silicate; nickel titanate; phthalocyanine.

11. Recording medium according to claim 1, wherein the surface roughening pigment particles comprise at least one of the materials of the group consisting of: carbon black; iron oxide; barium sulfate; silicate; nickel titanate; a phthalocyanine.

12. Recording medium according to claim 10 or 11, wherein the surface roughening pigment particles (12, 13) have a grain size having a diameter between about 2 to 10 μm, and wherein a major portion of the particles have a grain size in the order of about 5 μm.

13. Recording medium according to claim 1, wherein the substrate (10) comprises an elongated paper web;

and the metal layer (14) comprises a vapor-deposited layer of aluminum covering said contrast coating (11) and said pigment particles embedded therein, said metal layer having a thickness in the order of between about 0.01 to 0.1 μm.

14. Recording medium according to claim 1, wherein the thickness of the contrast layer (11), absent the surface roughening pigment particles, is between about 1 μm to 10 μm.

15. Recording medium according to claim 1, wherein the thickness of the contrast layer (11), absent the surface roughening pigment particles, is between about 1 μm to 10 μm, and said surface roughening pigment particles (12) have a grain diameter of between about 5 μm to 15 μm, the majority of said particles having a grain diameter in the lower diameter region of said range and at about 5 μm.

16. Recording medium according to claim 1, wherein the thickness of the contrast layer (11), absent the surface roughening pigment particles, is about 2 μm;

and the surface roughening pigment particles comprise agglomerates of carbon black which have a grain diameter of between about 5 μm to 15 μm, the majority of said agglomerates having a grain diameter in the lower diameter region of said range and at about 5 μm.

* * * * *